(12) United States Patent
Kirk

(10) Patent No.: US 10,108,929 B2
(45) Date of Patent: Oct. 23, 2018

(54) SYSTEMS AND METHODS FOR GENERATING A REPORT FROM STREAM DATA

(71) Applicant: MasterCard International Incorporated, Purchase, NY (US)

(72) Inventor: Stephen Christopher Kirk, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 36 days.

(21) Appl. No.: 15/178,408

(22) Filed: Jun. 9, 2016

(65) Prior Publication Data

US 2017/0357629 A1    Dec. 14, 2017

(51) Int. Cl.
| | | |
|---|---|---|
| G06F 17/00 | (2006.01) | |
| G06Q 10/10 | (2012.01) | |
| G06F 11/30 | (2006.01) | |

(52) U.S. Cl.
CPC .......... *G06Q 10/10* (2013.01); *G06F 11/3065* (2013.01); *G06F 11/3068* (2013.01)

(58) Field of Classification Search
CPC .................................................. G06F 11/3068
See application file for complete search history.

(56) References Cited

U.S. PATENT DOCUMENTS

| | | | |
|---|---|---|---|
| 5,101,424 A | | 3/1992 | Clayton et al. |
| 5,339,421 A | * | 8/1994 | Housel, III ............... G06F 9/54 703/27 |
| 6,031,625 A | * | 2/2000 | Sherman ........... G06F 17/30386 358/1.15 |
| 7,562,294 B1 | * | 7/2009 | Buis ....................... G06F 17/211 715/204 |
| 8,145,629 B2 | | 3/2012 | Labossiere et al. |
| 8,935,181 B2 | | 1/2015 | Rosenberg |
| 2004/0221233 A1 | | 11/2004 | Thielen |
| 2006/0288033 A1 | | 12/2006 | Raz |
| 2007/0130512 A1 | | 6/2007 | Thielen |
| 2007/0136316 A1 | | 6/2007 | Thielen |
| 2007/0136362 A1 | | 6/2007 | Thielen |
| 2007/0136363 A1 | | 6/2007 | Thielen |
| 2007/0150585 A1 | | 6/2007 | Chkodrov |
| 2010/0312679 A1 | | 12/2010 | Lebouitz |
| 2013/0198109 A1 | | 8/2013 | Rosenberg |
| 2015/0154696 A1 | | 6/2015 | Rosenberg |
| 2015/0222683 A1 | | 8/2015 | Celona |

* cited by examiner

*Primary Examiner* — Andrew T Mcintosh
(74) *Attorney, Agent, or Firm* — Armstrong Teasdale LLP

(57) ABSTRACT

A processing device and method for generating data reports from a data stream are provided. The processing device may include an analyzer that may identify a data record by detecting a start record event indicator and an end record event indicator within the data stream, the start and end record event indicators representing a start and an end of the respective data record, an extractor that may extract data of the identified data record from the data stream based on the start record event indicator and the end record event indicator, and a generator configured to generate, based on the event indicator, one or more events, wherein an event handler handles the one or more events to process the data record for inclusion into the data report.

20 Claims, 5 Drawing Sheets

SYSTEMS AND METHODS FOR GENERATING A REPORT FROM STREAM DATA

BACKGROUND

The present application relates generally to a technology that may be used to generate data reports, and more particularly, to systems and methods for reducing the use of system resources by generating data reports from streamed data rather than generating data reports from larger amounts of data.

Many organizations generate data reports to provide a window of information about the organization. For example, a data report may provide financial data, employment data, government data, weather data, educational data, and the like, over a period of time. As one example, a financial company, such as a bank that issues a payment card, may provide monthly reports, quarterly reports, yearly reports, and the like, to their customers as a way of providing their customers with financial information about their account over a period of time. Other entities such as hospitals, schools, government agencies, businesses, and the like, may use reports for many different reasons.

Reporting products that generate data reports typically require most, if not all, data from a report to be brought into memory in order to create the report and output the report. For reports made of large data sets, such data transfer can require significant memory resources. It can take hours or even days to generate data reports for larger organizations, for example, monthly or yearly financial record reports for a large corporation.

In order for a related data reporting system to generate a report from a database of records, all database records are typically loaded into memory (e.g., random access memory) and the entire set of records is analyzed as a single unit. In this case, when the related system generates a report based on a relatively large data set such as all of the records included in the database, a large amount of memory of the system is allocated to the data set and often requires mapping a portion of the memory to a relatively slower memory storage device such as a hard disk drive. Accordingly, performance of the related data reporting system is degraded as the data reporting system is left with little or no memory for performing analysis of the data and, in many cases, is forced to wait on the disproportionately slow access times associated with storing and retrieving data to and from the hard disk drive. Furthermore, the number of reports that can be created simultaneously or concurrently is reduced.

Accordingly, a system and method for generating a data report without requiring a large amount of system resources (e.g., memory or other storage) is desired. Also, a system that is capable of more efficiently processing a plurality of data reports simultaneously is desired.

BRIEF DESCRIPTION OF THE DISCLOSURE

In one aspect, a processor for generating data reports from a data stream is provided. The processor may include an analyzer configured to identify a data record by detecting an event indicator, wherein the event indicator includes at least one of a start record event indicator and an end record event indicator within the data stream, the start and end record event indicators representing a start and an end of the respective data record; an extractor that may extract data of the identified data record from the data stream based on the start record event indicator and the end record event indicator, and a generator configured to generate, based on the event indicator, one or more events, wherein an event handler handles the one or more events to process the data record for inclusion into the data report.

In another aspect, a method for processing a data stream to generate a data report is provided. The method may be performed by a processing device. The method may include receiving a data stream, identifying a data record by detecting an event indicator, wherein the event indicator includes at least one of a start record event indicator and an end record event indicator within the data stream, the start and end record event indicators representing a start and an end of the respective data record, extracting data of the identified data record from the data stream based on the start record event indicator and the end record event indicator, and generating, based on the event indicator, one or more events, wherein an event handler handles the one or more events to process the data record for inclusion into the data report.

In another aspect, an event-processing computing device for generating a data report is provided. The event processing computing device may include a data provider component configured to receive a data stream corresponding to the data report, detect an event indicator from the data stream, and determine an event, from among a plurality of events, based on the detected event indicator, a plurality of event handlers configured to process the plurality of events, respectively, and an event manager component configured to receive the event determined by the data provider, and route the event to a corresponding event handler for processing the respective event.

DETAILED DESCRIPTION OF THE DISCLOSURE

Figure 1:
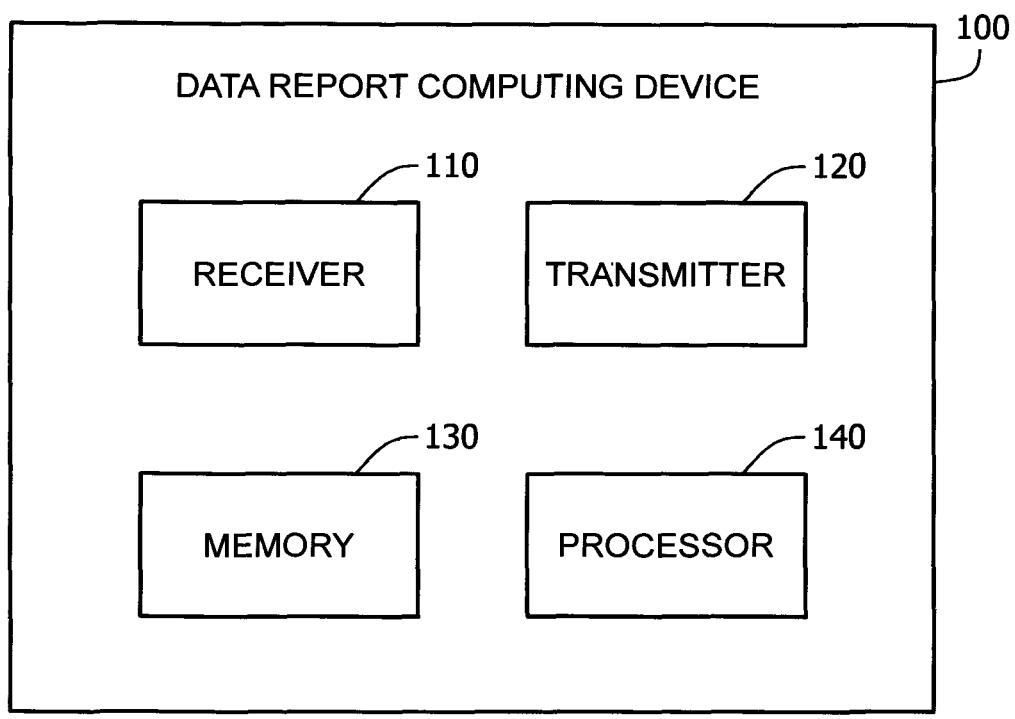
FIG. 1 is a diagram illustrating an example of a data report computing device in accordance with an example embodiment of the present disclosure.

The present embodiments are related to generating data reports and exports from streamed data, which may dramatically decrease the amount of memory used by the system when generating the data reports, in comparison to conventional systems. For example, rather than transfer an entire set of data records into a memory such as a local random-access memory (RAM) and generating a report while operating on all stored data records at once, the systems and methods described herein may receive a stream of data as in input. In this example, the stream may include one data record, the data records in one data report, a group of data reports, and the like. In other words, rather than generate a data report by processing an entire set of data records at once, a stream of data may be input to the system and processed.

Data reports may be used by many different organizations and entities in order to summarize, visualize, group together, and the like, various pieces of information over a period of time, for example, a day, a week, a month, a quarter, a year, and the like. Examples of organizations that generate data reports include financial entities such as banks, credit card companies, payment processing companies, investment agencies, online trading agencies, and the like. For example, a bank may generate a financial report for their customers on a monthly basis. The financial report may have various presentation characteristics such as wording, placement, graphics, styles, and the like.

A data reporting device according to various aspects includes a processor that may be coupled to a memory and to a data source. The processor may receive a stream of data from the data source. The stream of data may include one or more data records. Also, the stream may include event indicators which indicate a location in the stream at which one data record ends and another data record begins. Accordingly, the processor may process the stream of data one data record at a time or a small amount of data records at a time, and add the processed data records to a document to generate a data report. The report may be printed out, downloaded, transmitted, emailed, stored, and the like.

Most current reporting systems store a large amount of data into memory such as RAM during data reporting. However, storing this data can require storing the data of hundreds of thousands of transactions that have occurred over a period of a month or a year when generating large data reports such as data reports for large corporations. To process such a large amount of data records, a data reporting system may take hours or even days to run the entire report. According to various aspects, data records may be managed on an individual line-by-line basis by streaming data from the data records instead of storing all of the data into a memory and then managing the data. Accordingly, the data reporting system may receive and process a small subset of data at a time rather than receive an entire set of data and having to operate on the entire set of data.

Example of Data Report Computing Device

FIG. 1 is a diagram illustrating an example of a data report computing device in accordance with an example embodiment of the present disclosure.

Referring to FIG. 1, data report computing device 100 includes a receiver 110, a transmitter 120, a memory 130, and a processor 140. The data report computing device 100 may be or may be included in a computer, for example, a server, a desktop computer, a mainframe computer, and the like.

The receiver 110 may receive input from a user, for example, from an input unit (not shown) that is coupled to the data report computing device 100. As another example, the receiver 110 may receive a user input from another device, for example, through a wired connection, a wireless connection, or a combination thereof. That is, the receiver 110 may receive an instruction from a user of another computing device that is connected to the data report computing device 100 via one or more networks, such as the Internet. Also, the user of the other computing device may transmit a download request to the data reporting computing device 100 which may be received by the receiver 110. For example, the memory 130 of the data report computing device 130 may store data reports, and the download request may be a request to download a data report from the memory 130.

In response to the download request, the transmitter 120 may transmit the requested data report. For example, the transmitter 120 may transmit the data report to another computing device through one or more networks, such as the Internet. As another example, the transmitter 120 may transmit data reports to other computing devices periodically without a request. That is, the transmitter 120 may automatically transmit a data report to a customer (e.g., a cardholder) after a period of time elapses, for example, once a week, once a month, once a quarter, and the like.

The memory 130 may store data, for example, data related to data reporting and/or other data. The memory 130 may include one or more of a random access memory (RAM) such as dynamic RAM (DRAM) or static RAM (SRAM), a read-only memory (ROM), an erasable programmable read-only memory (EPROM), an electrically erasable programmable read-only memory (EEPROM), a non-volatile RAM (NVRAM), and the like. The memory types are exemplary only, and are thus not limiting as to the types of memory usable for memory 130 of the data reporting computing device 100.

The processor 140 may include one or more processing devices. For example, a processing device may be implemented using one or more general-purpose or special-purpose computers, such as a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processor 140 may access, store, manipulate, process, and create data when running software or executing instructions. In the examples herein, the processor 140 may be in communication with or may be coupled to the memory 130. Also, the processor 140 may control the operations of one or more of the receiver 110, the transmitter 120, and the memory 130.

According to various examples herein, the processor 140 may receive a stream of data. The stream of data may be received from, for example, a remote storage device, a local storage, and the like. As a non-limiting example, a data warehouse such as a data warehouse of a financial organization may stream data to the processor 140 where it is processed to generate a data report. In this example, when the processor 140 receives the data stream, or when a preset condition occurs, the processor 140 may perform a detection process on the data stream. A data stream may take many forms, for example, and without limitation, a byte stream, and XML stream, an HTTP request containing report data, or the like. For example, the processor 140 may detect a predefined event indicator representing a beginning of a data report, a beginning of a data record, and the like. The processor 140 may also detect another event indicator from the stream such as an end of a data report, an end of a data record, and the like.

When a predefined event indicator is detected (e.g., start event indicator), or when a pair of predefined event indicators is detected (e.g., start and end event indicators) the processor 140 may generate an event corresponding to the event indicator. An event may include a request that a stream of data be processed and/or analyzed to determine the content of the data corresponding to the event. Additionally, the processor 140 may transmit the event to an event manager component that is processed by the processor 140. In one embodiment, the data stream includes only report start/end and data start/end event indicators. All other event data is created by the event handler as part of data processing. This has the effect of separating data functions (processed by data providers) from report presentation functions (processed by event handlers).

In an example, the processor 140 may receive a request for processing a monthly data report for a corporation. According to various aspects, rather than load all data records for the monthly report into memory 130, and operating on the data from the data records stored in memory, a small subset of records, for example, one data record may be transmitted to the processor 140 and processed by the processor 140 without having to store the data record in the memory 130. In addition, because system resources are freed because data is not stored in memory 130, a plurality of reports may be simultaneously processed by the processor 140 in a manner that is much more efficient. In this example, more reports are capable of being processed at the same time than in a system in which data records are transferred to memory and the entire data is operated on as a whole. In the exemplary embodiment, a report can be stored on local storage, in local memory until complete and then streamed to remote storage, or streamed directly to remote storage as it is created.

As will be appreciated, each page of the report may be generated such that a predetermined amount of data records or a predetermined amount of data appears per page. For example, each page of a report may include 10 data records, 20 data records, 50 data records, and the like. As another example, each page of a report may include 25 lines of data, 40 lines of data, and the like without a limitation on data records. Furthermore, one or more event indicators may be included in the data stream in order for the processor 140 to recognize the end of a page in the report and the beginning of another page in the report. In the example embodiment, the data stream should not include presentation aspects beyond a pointer to the presentation model. The presentation model and the resulting event processing should determine when a new page is needed. The presentation model will determine things like landscape or portrait orientation, which will impact the number of records that can be written to each page. For example, one event indicator may be used to signal the end of a page of the report and another event indicator may be used to signal the beginning of another page. In response to the report being generated, the report may be printed out, it may be stored locally or in another device for future download, it may be transmitted to another device, and the like. The report may be stored, printed, transmitted and the like, automatically, periodically, in response to a user input, and the like.

Example of an Event Computing Process for Generating a Data Report

Figure 2:
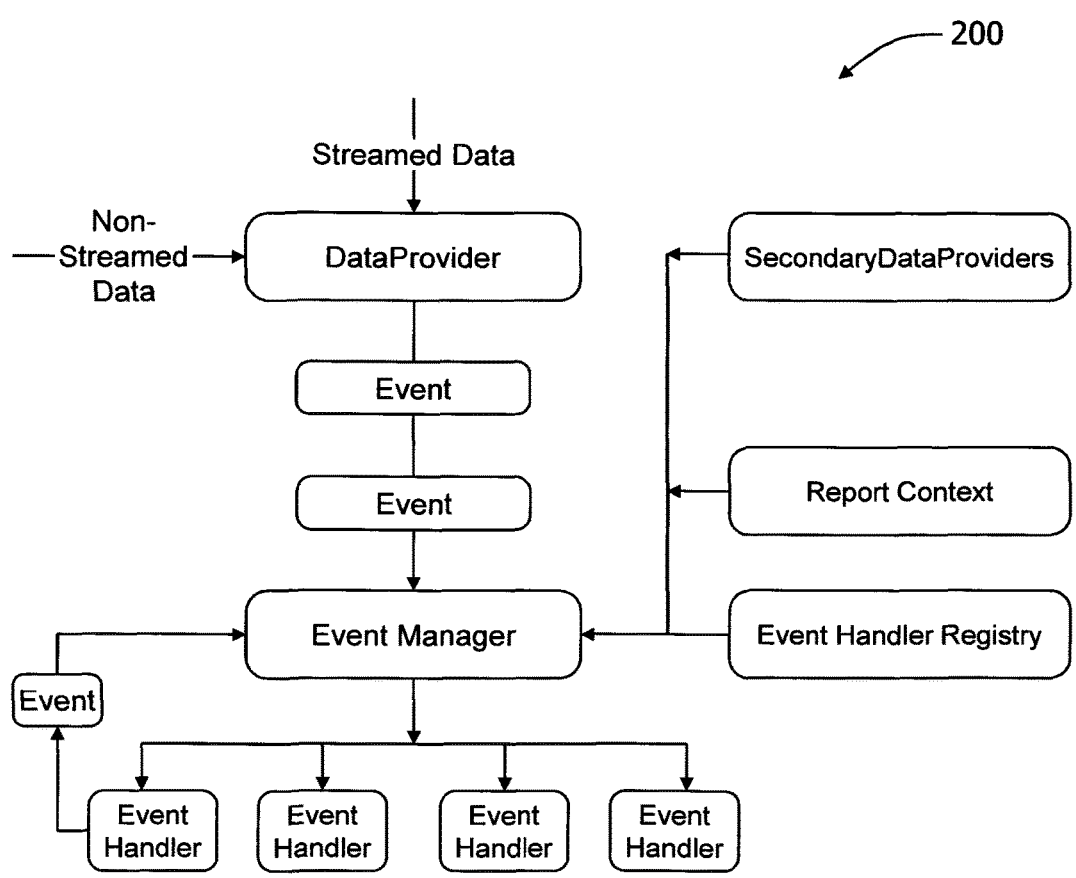
FIG. 2 is a diagram illustrating an example of an event processing flow performed by a processing device in accordance with an example embodiment of the present disclosure.

FIG. 2 is a diagram illustrating an example of an event processing flow 200 of a processing device in accordance with an example embodiment of the present disclosure. Streamed data may be an open socket from a remote system, a local, in-memory representation of a database query result that contains a window of data (i.e. rows 11-20 of 40 data records), or from remote storage.

Referring to FIG. 2, an event processing example is shown which may be used to generate a data report. For example, the event processing may be executed by the processor 140 shown in FIG. 1. According to various examples, during processing data may be provided to a data provider component. For example, the data may be streamed data, non-streamed data, and the like. The data may be received from an external storage, a local storage, and the like. Regardless of a type of the data, the data provider component may generate events from the streamed data. In the example embodiment, the data provider component sends only data events and not report presentation events. Accordingly, the data provider sends only start/end report events and start/end data events, but not start/end page events or start/end group events.

The data provider component may generate an event by receiving a predefined amount of data in the stream and storing the received data in the memory in association with the event. As another example, the data provider component may detect a first event indicator in the data stream and generate an event corresponding thereto by receiving additional data in the stream until a second event indicator is present in the stream. In this example, the first event indicator indicates the start of a data record and the second event indicator indicates an end of the data record. As yet another example, the data provider component may generate an event in response to detecting a start event indicator and a corresponding end event indicator in the stream. A still further example would be a start event indicator with a pre-defined, fixed length.

In this example, the data provider component may receive the data in whatever data format it is in, whether it be a database record, an XML record, listening on a socket for a predetermined amount of bytes, and the like, and translate the data format into one or more events. The data provider component transmits events to an event manager component. In this example, the data provider component may not know how much total data is being streamed. That is, the data provider component does not need to operate on an entire set of data. Rather, the data provider component may receive and translate data records in small byte size data pieces such as individual data records based on event indicators within the stream. The data provider may also act as a filter if the data source is unable to filter the data.

Events generated by the data provider component may be transferred to an event manager component. In this example, the event manager component may route an event to an appropriate event handler for processing. For example, the processor may include a plurality of event handler components that are used to process respective types of events. As a non-limiting example, each presentation aspect of a report may correspond to a separate event and a separate event handler component. An event handler component is configured to receive the data stream and raise new events based on the data. For example, an event handler may receive the data stream and determine that a new page must be created in the report because the current page lacks sufficient space to properly present the received data. Accordingly, the event handler component may raise a "create new page" event in response in order to display the remaining portion of the data.

The event handler component is also responsible for additional actions. In the example embodiment, the event handler component is configured to create new report fields. New report fields may be created using existing report fields from the data stream. The event handler component may create new fields by concatenating two or more existing fields (e.g., by creating a field titled Full Name created by concatenating fields titled First Name, Middle Initial, and Last Name). The event handler component is also configured to create new fields by performing mathematical operations on existing fields (e.g., by creating a field titled Monthly Average Sales created by dividing a field titled Annual Sales by 12).

The event handler component is also configured to generate portions of the report by using data that is received via the data stream in an unformatted fashion, or by using data that does not appear in the data stream. For example, the event handler component may generate report headers and footers, group headers and footers, summary rows (e.g., for field sums and averages), or the like. Headers and footers may be further configured to include column headings, branding, signature blocks, or the like.

The event handler component is also configured to output formatted data rows in response to data events. The event handler component is also configured to raise events that control the creation of other events. For example, the event handler component may raise a page end event on determining that the current report page is out of space. However, the event handler component may concurrently determine that the data stream contains additional data to be presented. Therefore, the raised page end event may cause the creation of a new page start event in order to generate a new report page to present the additional data.

Additionally, the event handler component is configured to group data from the incoming data stream. In the example embodiment, a report model (described in more detail with reference to FIG. 3 below) is used by the event handler component to determine how to group the data. The event handler component groups data according to the report model and also adds group headers and footers as appropriate. For example, the data stream may provide sales data for a salesperson for the year 2015, including fields such as daily sales amounts, client identifiers, product identifiers, and the like. The event handler component may group this sales data for 2015 into monthly sales report groups. Each group includes a group header and footer for each month as well as monthly total sales. As noted above, the event handler component may sum daily sales amounts per month to generate a new field for monthly sales. The event handler component may also generate new fields based on the report model (e.g., highest selling product by month, largest client per month, average sales per month, or the like).

After the events are handled by one or more event handler components, a result of the processing may be written into the document of the data report. As another example, an event being processed by an event handler may generate another event which may be transferred to the event manager component to be routed properly. After the event is processed by an event handler, the event and the data associated therewith may be deleted, thus conserving system resources.

As described in this example, the event processing may be stateless. However, a report context component may store a number of pages which have been written to similar to a counter. In this example, the report context component may act as a holding area for state. For example, the report context may increment the number of pages that have been written to with each new page that is generated. Accordingly, an event handler may know a current page of the data report. For example, a page event handler may know the current page is page 27, and in response to detecting a new page starting event, the page event handler may increment the current page from page 27 to a current page of page 28. The report context component may also store global settings for a report such as presentation settings, default settings, and the like.

Additionally, the report context component can track mathematical analysis that spans records (i.e., providing a sum or average through data stored in the context and updated on each data record). The report context component can also track groupings within reports (so that the sum of a group can be written to the report before starting the next group).

In some examples, the processor may detect at least one metadata item from the data stream including the data record, for example, a data record number, row number, and the like. The metadata may also be included in the report context. Also, the event manager component may access the report context, or receive the report context from the report context component. For example, the event manager component may access or receive state information associated with a report, such as a current page number, a current record number, a current position within the report, and the like. Each time a data record is streamed to the data provider component, a data record event corresponding thereto may be transferred to the event manager component. The event handler component may include a handler that is listening for a number of data records events and that is capable of determining whether too many events or enough events have been written to a current page. If they have, a new page may be created. In this case, a page end event is initiated and a new start page event is created, which starts the next page, and the processing of the data records continues.

The data reporting device may store a set of references to a plurality of event handler components in a registry of the memory. Additionally, the data reporting device may identify at least one event handler component that is to receive the event based on the set of references stored in the registry, and transmit the event to the at least one event handler component. Examples of event handler components are further described herein with respect to FIG. 3.

Example of Event Handler Registry

Figure 3:
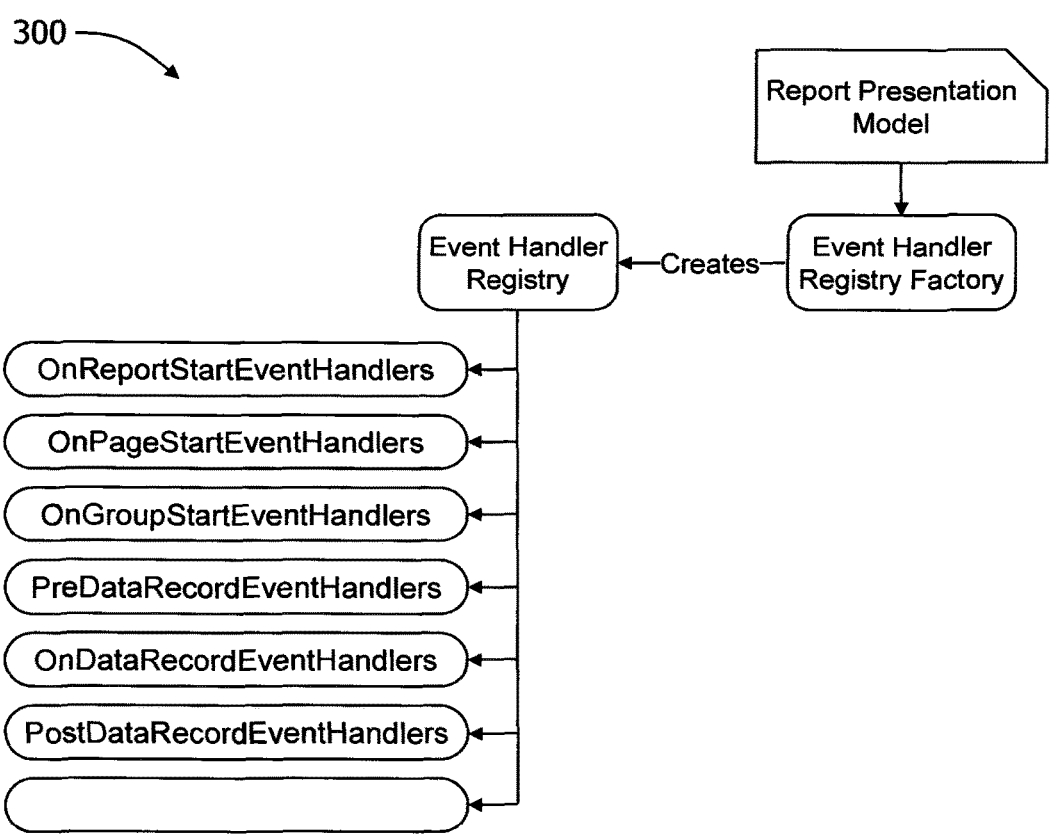
FIG. 3 is a diagram illustrating an example of an event handler registry process in accordance with an example embodiment of the present disclosure.

FIG. 3 is a diagram illustrating an example of an event handler registry process 300 in accordance with an example embodiment of the present disclosure.

Referring to FIG. 3, the data reporting device (e.g., the processor) may receive a report model file that defines a plurality of presentation components of a data report, including a format for the report, a style of the report, data to be included in the report, a field ordering, and the like, and generate a corresponding event handler component for each of the report features defined in the report model file. The processor may store a corresponding reference to each generated event handler component in a registry (e.g., event handler registry component shown in FIGS. 2 and 3). The report model file may also define new composite fields created from concatenating fields together, define new composite fields created from performing mathematical calculations on fields (i.e. adding 2 fields together), and define mathematical fields (i.e. sum and average) for use in report or grouping footers.

In the examples herein, the processor may generate the event handlers based on the presentation model file. In FIG. 3, the processor generates a plurality of event handlers including event handlers for a report start, a report end, a page start, a page end, a group start, a group end, a pre-data record, a data record, and a post-data record. For example, the report start and report end events may indicate a start and a stop of a data report, the page start and page end events may indicate a start and a stop to a page, a group start and a group end may indicate a start and a stop of a group of pages or reports, and the like.

For example, a presentation model may be generated previously stored or may be uploaded at the time a data report is processed. The model may include various display characteristics of a report for example, what is included in a page header, does a page have a page header, what does the page header look like, do you want page numbers in the header, and the like. The presentation module may also include display characteristics of the footer of the data report, the body of the data report, and the like. Each feature of the presentation module may be used to create a collection of handlers that generate the report by creating, modifying, or updating a corresponding feature of the data report. Accordingly, the registry includes a collection of handlers that output the report according to the model. That is, the presentation model includes pieces of data that are related to what data is pulled from a data stream and which are related to the presentation of the data report.

In the example of FIG. 3, the event handler registry factory ("factory") is used to generate the event handler components based on the features included in the presentation model. For example, the factory may look at the presentation model and determine various event handlers. In an example in which the factory detects a page header in the presentation model, the factory may add a page header event handler to a spot within the registry. Also, the implementation of the page header may be based on any number of locations on a page. Accordingly, the factory can create any amount of desired event handlers corresponding to features of a page presentation, a report presentation, and the like.

In the examples of FIGS. 2 and 3, a data stream is processed via an event-processing technique. For example, FIGS. 2 and 3 may represent an event-processing computing device that may generate a data report via event-processing. Referring to these examples, the computing device may include a data provider component that may receive a data stream corresponding to the data report, detect an event indicator from the data stream, and determine an event, from among a plurality of events, based on the detected event indicator. For example, an event indicator may be used to identify a data report start event, a page start event, a data group start event, a pre-data record event, a data record event, a post data record event, a data group end event, a page end event, a report end event, and the like.

The event-processing computing device may include a plurality of event handlers. Each event handler may be dedicated to processing a respective type of event. As another example, each event handler may be configured to process a plurality of event types. As shown in FIG. 2, an event manager component may receive an event determined by or generated by the data provider, and route the event to a corresponding event handler for processing the respective event. After the event is processed by the event handler, the event is deleted thereby reducing the use of system resources. Also, referring to FIG. 3, an event handler generator component (i.e., the factory) may generate event handlers based on a presentation model of the data report. Accordingly, each data report may be processed individually and dynamically based on specific features included in the data report. For example, each data report may have its own respective presentation model. Accordingly, prior to processing a data stream including a data report, the presentation model associated with the data report may be transferred to the event-processing computing device.

Example of a Processing Device

Figure 4:
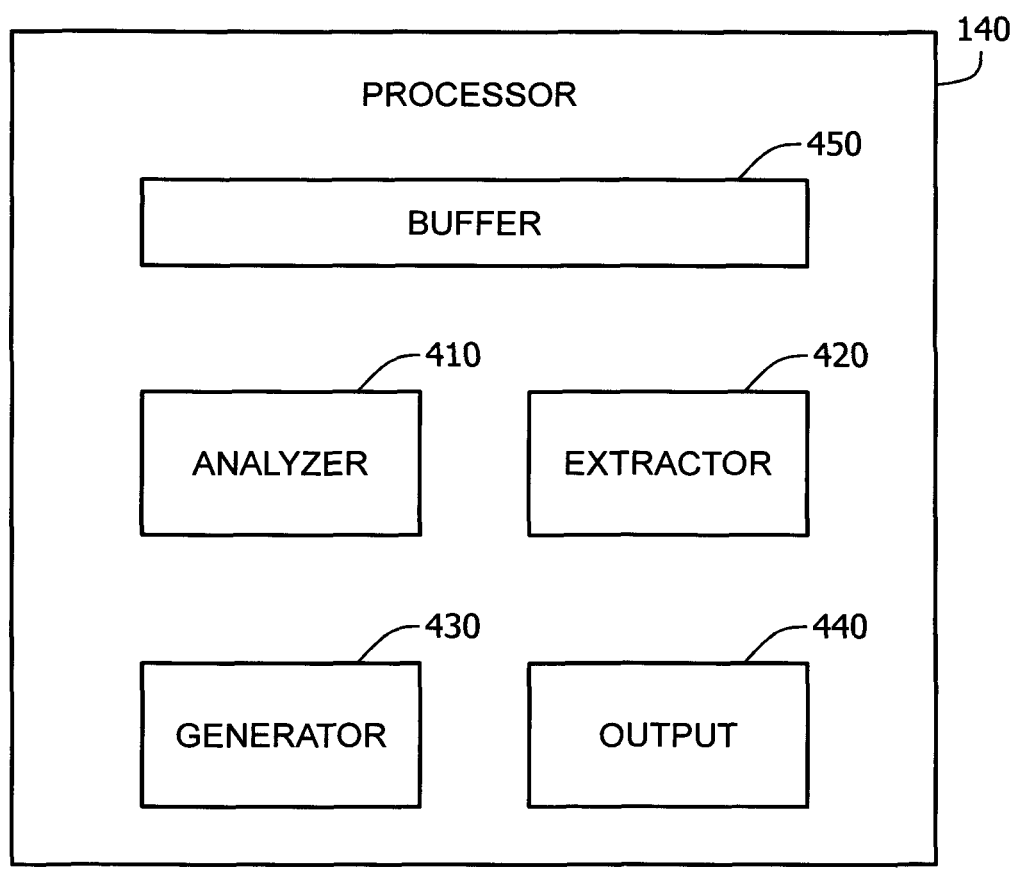
FIG. 4 is a diagram illustrating an example of a processor for generating a data report using stream data in accordance with an example embodiment of the present disclosure.

FIG. 4 is a diagram illustrating an example of a processor for generating a data report using stream data in accordance with an example embodiment of the present disclosure. Referring to FIG. 4, processor 140 may be used to process a data stream to generate data reports. In this example, the processor 140 includes an analyzer 410, an extractor 420, a generator 430, and an outputter 440. In some examples, the processor 140 may also include a buffer 450. For example, the processor 140 may be an event-based processor, and the like. Also, the processor 140 may include additional features that are not shown in FIG. 4. The processor 140 may be a single core processor, a multi-core processor, a reconfigurable processor, a plurality of processors, and the like.

In the example embodiment, the analyzer 410 may detect data records from a data stream. In the exemplary embodiment, the analyzer 410 identifies a start report event indicator, which includes a report identifier. For example, the analyzer 410 may identify a data record by detecting a start record event indicator and an end record event indicator within the data stream. The start and end record event indicators may represent a start and an end of data included in a respective data record. For example, the data included in the stream between the start record event indicator and the end record event indicator may be included in a data record. According to various examples, a data record may include a transaction such as a financial transaction, and the like. The extractor 420 may extract data of a data record from the data stream based on the start record event indicator and the end record event indicator identified by the analyzer 410.

The analyzer 410 also identifies start/end data record event indicators. In an alternate embodiment, the length of a data record is communicated in the start data record event indicator such that the stream does not need to include an end data record event indicator. In a still further embodiment, the length of the data record for the report definition is fixed and pre-configured such that neither a start or end data event indicator is required.

The extractor 420 is configured to extract data from the stream, create data record events, and send the events to the event handler. Additionally, the extractor 420 creates a "start report event" (i.e., an event indicating a start of the report) and transmits the start report event to a start report event handler. The start report event handler uses the report identifier in the start report event to retrieve a pre-existing report definition (fields, font, etc.) from memory 130 and construct the collection of event handlers that will build the actual report. In another embodiment, the start report event handler is limited to only build reports with a single report definition so that the report identifier is pre-configured rather than communicated in the start report event. In other words, regardless of the transmitted report identifier, there is only one available report definition for use in building the report. In a still further embodiment, the report definition is communicated in the start report event rather than being pre-configured.

In the example embodiment, the extractor 420 may extract data from the stream, without the data stream being stored in a memory, for example, a local memory of the processor 140 or of a computing device including the processor. The generator is configured to generate one or more event handlers that will handle events raised by the data. In one embodiment, a generated event handler may insert the extracted data of the identified data record into a data report.

A data report may include a plurality of data records. For example, a data report may include a day's worth of data records, a week's worth of data records, a month's worth of data records, and the like. According to various aspects, the processor 140 may operate the same regardless of the size of the data record being processed. This is different in comparison to related data report processors which store all data first, prior to processing the data. In the related case, the larger the amount of data the slower the processor may be. In contrast, in the present examples, because the processor 140 may operate on one data record at a time, or small amount of data records at a time, the speed of the processor 140 may be independent of the length of the data (number of data records) but dependent on width of the data (size of the data record).

According to various aspects, the analyzer 410 may identify a plurality of data records by detecting a plurality of pairs of start and end record event indicators within the data stream. For example, the analyzer 410 may detect a first pair of start and end record event indicators, a second pair of start and end event indicators, a third pair of start and end event indicators, and the like. The extractor 420 may extract data of each of the plurality of identified data records from the data stream. For example, the extractor 420 may extract data between a pair of record event indicators as the data of a data record. The generator 430 may generate event handlers to successively insert the extracted data of the plurality of data records into the data report. For example, the generator 430 may generate event handlers to insert the data of the data records one line at a time, and the like.

In response to the new page being detected and/or the end of the page being detected, the generator 430 may generate event handlers to insert data of a next data record into a new page of the data report. In some examples, the generator 430 may generate event handlers to insert a current page number in a current page of the data report in response to the analyzer 410 detecting the new page event indicator in the data stream. Similarly, the analyzer 410 may detect a start report event indicator and an end report event indicator indicating a start and an end to the data report.

In some examples, the processor 140 may receive a report model that indicates at least one of a font, a style, a field ordering, and the like, of a data report. For example, the report model may include any number of features for defining how a data report visually appears. Also, the generator 430 may generate event handlers to insert a data record into a data report based on the report model.

The output 440 may output the data report to at least one of a storage device and a display, in response to an end of report event indicator being detected by the analyzer. For example, the output 440 may output a data report to a local storage of the processor or a computing device including the processor. As another example, the output 440 may store the data report in a remote storage, for example, a remote storage included in a remote storage device connected via one or more networks with the processor 140 or a computing device including the processor 140. The stored data report may be accessed, for example, downloaded by a customer, and the like.

According to various aspects, the processor 140 may receive a data stream from another computing device or storage device, for example, a remote computing device. The processor 140 may generate a data report from data included in the data stream without storing the data from the data stream in a local memory. Accordingly, the processor 140 may operate on a data stream instead of operating on a data storage including all records from a data report.

Example of a Data Processing Method

Figure 5:
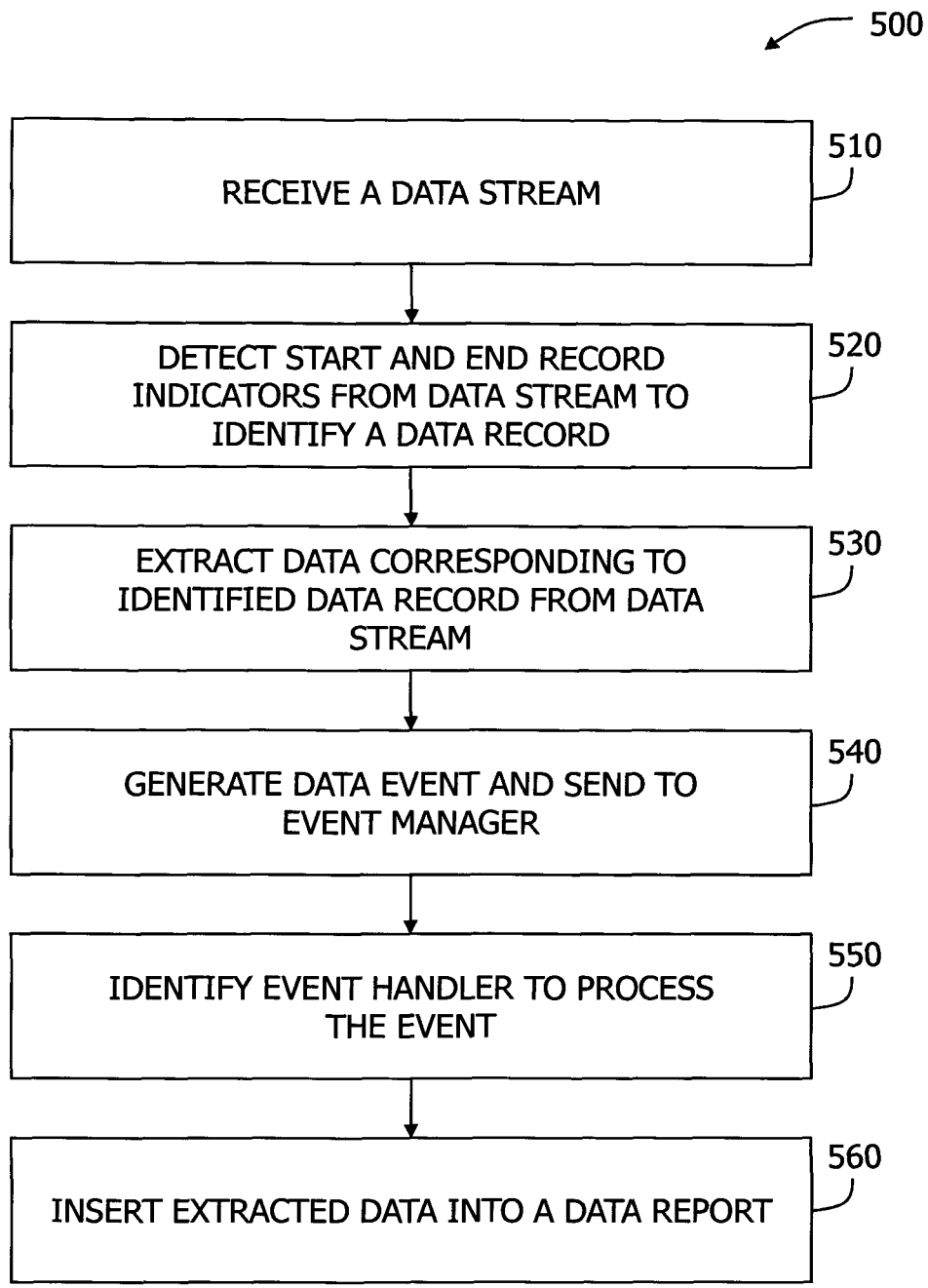
FIG. 5 is a diagram illustrating an example of a method for generating a data report from streamed data in accordance with an example embodiment of the present disclosure.

FIG. 5 is a diagram illustrating an example of a method for generating a data report from streamed data in accordance with an example embodiment of the present disclosure.

Referring to FIG. 5, an example of a method for processing a data stream to generate a data report that may be performed by a processing device is shown. The method includes receiving a data stream, in 510. For example, the data stream may be received from a local storage, a remote storage, a web site, and the like. The data stream may include one data report, a plurality of data reports, a portion of a data report, and the like.

In 520, the method 500 further includes identifying a data record by detecting a start record event indicator and an end record event indicator within the data stream. For example, the start and end record event indicators may represent a start and an end of the respective data record. Between the start and end record event indicators of the data stream may be data corresponding to the data record. Accordingly, the method may determine that the data between the start and end record event indicators is included in the data record.

In 530, the method 500 includes extracting data of the identified data record from the data stream based on the start record event indicator and the end record event indicator. In 540, the method 500 includes generating a data event and sending it to the event manager component.

In 550, the method 500 includes identifying the event handler that will process the generated event. In 560 the method includes inserting the extracted data of the identified data record into a data report.

In some examples, the identifying may include identifying a plurality of data records by detecting a plurality of pairs of start and end record event indicators within the data stream, the extracting may include extracting data of the plurality of identified data records from the data stream, and the inserting may include inserting the extracted data of the plurality of data records into the data report.

Here, the inserting may include inserting data of a next data record into a new page of the data report. The method 500 at 560 involves inserting data into the report in response to an event. In response to an event, an event handler is created to handle the event. Subsequently, the event handler can insert data into the report (e.g., if the event raised was to insert data or write to the report). For example, a start event indicator may be included in a first record of a next page, and an end record event indicator may be included in a last record of a current page. Also, the inserting may include inserting a current page number in a current page of the data report in response to detecting the new page event indicator in the data stream. In addition to records and pages, the method may include detecting a start report event indicator and an end report event indicator indicating a start and an end to the data report.

In some aspects, the method may include receiving a report model including at least one of a font, a style, and a field ordering of the data report. Here, the inserting may include inserting the identified data record into the data report based on the report model.

According to various examples herein, by streaming a data report into a processor of a computing device, the data report does not have to be stored by the computing device in memory. Accordingly, rather than operate on all data of a data report stored in memory, the processor may generate a data report by operating on data from one data record at a time by detecting and extracting the data record from the stream of data. Furthermore, because the data is not stored in memory prior to processing, the computing device can be faster and more efficient. Accordingly, the processor may be used to simultaneously process a plurality of data reports in an efficient manner in comparison to a related processing device that stores all data in a local memory or an external memory prior to generating the data report.

Additional Considerations

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for generating a data report from streamed data. In this example, the computing device may include a memory device and a processor in communication with the memory device, and when executed by said processor the computer-executable instructions may cause the processor to perform a method such as the method described and illustrated in the example of FIG. 5.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example, the system is executed on a single computer system, without a connection to a server computer. In a further example, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional examples that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An event-processing computing device, comprising:
    a memory for storing a presentation model for a data report including a plurality of data records; and
    a processor for generating the data report from a data stream, the processor comprising:
        a buffer separate from the memory;
        an analyzer configured to identify within the data stream a data record event by detecting at least one of a start record event indicator and an end record event indicator within the data stream, the start and end record event indicators representing respective locations within the data stream of a start and an end of a first data record of the plurality of data records that corresponds to the identified data record event;
        an extractor configured to (i) extract into the buffer the first data record of the identified data record event from the data stream based on the start record event indicator and the end record event indicator, and (ii) create a report event based on the extracted data record, wherein the created report event includes at least one report identifier; and
        a generator configured to generate, based on the event indicator, one or more event handlers for (i) receiving the identified data record event and the created report event, (ii) retrieve at least one report definition from the presentation model using the report identifier (iii) inserting the extracted data record into the data report according to the retrieved report definition,
    wherein the data stream is not stored in the memory.

2. The computing device of claim 1, wherein the analyzer is further configured to identify a plurality of data record events, respectively corresponding to the plurality of data records, by detecting a plurality of pairs of start and end record event indicators within the data stream, wherein the extractor is further configured to extract the respective data records from the plurality of identified data record events within the data stream, and wherein the generator is further configured to generate a plurality of data insertion events to instruct the one or more event handlers to respectively insert the extracted data records into the data report according to the presentation model.

3. The computing device of claim 1, wherein the generator is further configured to generate a new page event to instruct the one or more event handlers to insert a new extracted data record into a new page of the data report.

4. The computing device of claim 3, wherein the generator is further configured to generate a current page number event to instruct the one or more event handlers to insert a current page number in a current page of the data report in response to the analyzer detecting the new page event indicator in the data stream.

5. The computing device of claim 1, wherein the analyzer is further configured to detect a start report event indicator and an end report event indicator indicating a start and an end to the data report.

6. The computing device of claim 1, wherein the retrieved report definition includes at least one of a font, a style, and a field ordering of the data report.

7. The computing device of claim 1, further comprising an output component configured to output the data report to at least one of a remote storage device and a display, in response to an end of report event indicator being detected by the analyzer.

8. The computing device of claim 1, further comprising a receiver configured to receive the data stream from a remote computing system.

9. A method for processing a data stream to generate a data report including a plurality of data records, the method being performed by a computing device having a processor and a memory, the method comprising the steps of:
    receiving the data stream;
    identifying within the data stream a data record event by detecting at least one of a start record event indicator and an end record event indicator within the data stream, the start and end record event indicators representing respective locations within the data stream of a start and an end of a first data record of the plurality of data records that corresponds to the identified data record event;
    extracting the first data record of the identified data record event from the data stream based on the start record event indicator and the end record event indicator;
    creating a report event based on the extracted data record, wherein the created report event includes at least one report identifier; and
    generating, based on the event indicator, one or more event handlers for (i) receiving the identified data record event and the created report event, (ii) retrieve at least one report definition from the presentation model using the report identifier (iii) inserting the extracted data record into the data report according to the retrieved report definition,
    wherein the data stream is not stored in the memory.

10. The method of claim 9, wherein the step of identifying further comprises identifying a plurality of data record events, respectively corresponding to the plurality of data records, by detecting a plurality of pairs of start and end record event indicators within the data stream, wherein the step of extracting further comprises extracting the respective data records from the plurality of identified data record events within the data stream, and wherein the step of generating further comprises generating a plurality of data insertion events to instruct the one or more event handlers to respectively insert the extracted data records into the data report according to the presentation model.

11. The method of claim 9, further comprising inserting data of a next data record into a new page of the data report.

12. The method of claim 9, further comprising detecting a start report event indicator and an end report event indicator indicating a start and an end to the data report.

13. The method of claim 9, wherein the retrieved report definition includes at least one of a font, a style, and a field ordering of the data report.

14. The method of claim 9, wherein the presentation model includes one or more of a mathematical field definition and a composite field definition, wherein the composite field definition defines at least one new composite field created by one or more of (i) concatenating two or more fields together, and (ii) performing mathematical calculations on fields.

15. The method of claim 9, wherein the step of receiving further comprises receiving the data stream from a remote computing system.

16. The method of claim 9, further comprising the step of outputting the data report to at least one of a remote storage device and a display, in response to detecting an end of report event indicator.

17. An event-processing computing device for generating a data report including a plurality of data records, the event-processing computing device comprising a memory and a processor, the processor comprising:
    a data provider component configured to (i) receive a data stream corresponding to the data report, (ii) detect a record event indicator from the data stream, and (iii) determine a first data record event, from among a plurality of data record events, based on the detected record event indicator;
    a plurality of event handlers configured to (i) process the plurality of data record events, respectively, (ii) extract data from the plurality of data record events, (iii) generate a report presentation event, based on a presentation model of the data report, indicating a presentation aspect for the plurality of data record events, and (iv) insert the extracted data from the plurality of data record events into the data report according to the presentation aspect of the report presentation event; and
    an event manager component configured to (i) receive the first data record event, and (ii) route the first data record event to a corresponding event handler of the plurality of event handlers for processing the first data record event prior to inserting the extracted data into the data report.

18. The event-processing computing device of claim 17, wherein the first data record event comprises at least one of a data record start, a data record end, and wherein the report presentation event comprises at least one of a report start, a report end, a page start, and a page end.

19. The event-processing computing device of claim 17, wherein the first data record event is deleted after being processed by a respective event handler.

20. The event-processing computing device of claim 17, further comprising an event handler generator component configured to generate the plurality of event handlers based on the presentation model of the data report.

* * * * *